PRODUCTION OF DIGLYCIDYL ETHERS OF DIOLS

Ferdinand Meyer, Ziegelhausen, and Kurt Demmler, Ludwigshafen (Rhine), Germany, assignors to Badische Anilin- & Soda-Fabrik Aktiengesellschaft, Ludwigshafen (Rhine), Germany
No Drawing. Filed Apr. 11, 1962, Ser. No. 186,624
Claims priority, application Germany May 14, 1955
5 Claims. (Cl. 260—348.6)

This invention relates to the production of diglycidyl ethers of diols with two primary hydroxyl groups.

It is known to prepare diglycidyl ethers by the reaction of diols with epichlorhydrin in the presence of acid catalysts and splitting off of hydrochloric acid from the diol dichlorhydrin ethers formed. The monochlorhydrin ethers thereby first formed can further react with epichlorhydrin not only at the hydroxyl group of the dihydric alcohol which is still free but also at the hydroxyl group of the chlorhydrin grouping. Thus a mixture of glycidyl ethers is obtained which contains only about 30% of the pure diglycidyl ether. It has therefore also already been proposed to prepare diglycidyl ethers of diols from their monoallyl ethers and epichlorhydrin. In this way hypochlorous acid adds on to the allyl double linkage of the monoallyl diol ether reacted with epichlorhydrin and finally hydrogen chloride is withdrawn from the addition product in known manner. The yields in this process are also bad in the individual stages of the reaction.

We have now found that diglycidyl ethers can be prepared in good yields from diols with two primary hydroxyl groups and epihalogenhydrins by first reacting the diol in the presence of an acid catalyst with 0.5 to 1 mol, in particular 0.65 to 0.85 mol, of an epihalogenhydrin and then, after removal of the unreacted diol, with a further 0.3 to 0.7 mol, in particular 0.35 to 0.55 mol, of epihalogenhydrin at elevated temperature, the diglycidyl ether being prepared finally in known manner from the resultant dihalogenhydrin ether formed. The maximum yields are obtained when 0.75 mol of epihalogenhydrin is used in the first stage of the reaction and 0.45 mol in the second stage. The yields are always satisfactory, however, in the remainder of the given ranges.

The diglycidyl ethers obtained have the general formula

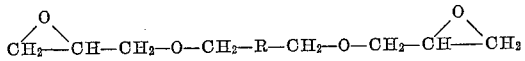

R can be an aliphatic, cycloaliphatic or aromatic radical, if desired interrupted by hetero atoms, in particular oxygen, and if desired substituted, or R can also be lacking. As substituents for the radical R there come into question for example alkyl, cycloalkyl or aryl radicals and also negative substituents, as for example halogen, in particular chlorine or bromine. All diols with two primary hydroxyl groups may be used for the production of diglycidyl ethers, as for example ethylene glycol, 1.3-propylene glycol, 1.4 -butane-diol, 1.6 -hexane-diol, betaglycerine chlorhydrin, and also polyglycols, such as di- or tri-ethylene glycol, as well as terephthalic alcohol

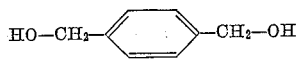

1.1-dimethyl - 1.1 - dimethylol-methane or chlorinated dimethylolcyclohexanes, or mixtures of the same. In general epichlorhydrin is used as the epihalogenhydrin, but epibromhydrin, for example, may also be used. Suitable acid catalysts are for example acid metal salts such as the Friedel-Crafts' catalysts, thus for example aluminum chloride or boron trifluoride, or their adducts, as for example to ethers, and also acids, preferably inorganic acids, as for example sulfuric acid, boric acid or phosphoric acid in an amount of about up to 5% with reference to the diol. But also bigger amounts of acid catalysts may be used.

In the first stage of the process, the diol is reacted with 0.5 to 1 mol and in particular 0.75 mol of an epihalogenhydrin in the presence of an acid catalyst. To begin the reaction, it is heated to temperatures above about 40° C. After the reaction has been initiated, it is preferable to keep the reaction temperautre between about 50° and 110° C. This is achieved for example by regulating the supply of epihalogenhydrin and if necessary cooling. Heating is continued until the whole of the epihalogenhydrin has been used up. This is established with the aid of the known methods for determining epoxy groups, for example by boiling for 20 minutes a sample of 1 gram of the product with an excess of pyridinium chloride dissolved in pyridine (prepared by adding to 16 ccs. of concentrated hydrochloric acid such an amount of pyridine that a total volume of one liter is obtained), whereby the pyridinium chloride adds on hydrogen chloride to the epoxy groups and converts them into chlorhydrin groups. The excess of pyridinium chloride is then titrated back with 0.1-normal caustic soda solution to the phenolphthaleine end point. The epoxy group content is calculated by assuming that 1 HCl is an equivalent for one epoxy group. When epoxy groups are practically no longer detectable in the reaction product, the unconverted diol is distilled off and the monochlorhydrin ether formed is reacted in the second stage of the process with 0.3 to 0.7 mol, in particular 0.45 mol, of epihalogenhydrin, if desired with the addition of small amounts of an acid catalyst, for instance one of the acid catalysts mentioned for the first reaction step. In this way about 70% of diol-dihalogenhydrin ether and about 30% of higher halogenhydrin ethers are obtained. The dihalogenhydrin ether, if desired after distillation, is then reacted in known manner with the aid of basic compounds to form the diglycidyl ether while splitting off hydrogen halide. For the splitting off of the hydrogen halide there is used for example an aluminate, zincate or silicate, (U.S. Patent 2,538,072), or the amount of, for example, an alkali hydroxide which is theoretically necessary, in particular sodium hydroxide in an about 50% aqueous solution to which preferably about 30%, with reference to the diglycidyl ether obtained, of an alcohol, as for example butanol, or a hydrocarbon, such as toluene, are added. Working is with cooling, preferably to temperatures of about 0° C.

The diglycidyl ethers formed may readily be recovered pure by distillation, preferably in vacuo, but the resulting mixture which contains a maximum amount of diglycidyl ether, can be further worked up directly for many purposes. The diglycidyl ethers obtained are valuable initial materials for the production, for example, of plastics, synthetic fibers or lacquers. For this purpose they can be hardened in known manner with polycarboxylic acids while heating or with amines or polyamines while cold. Moreover, they are valuable pharmaceutical products and intermediate products. Finally it is also possible to break off the process after the first reaction stage and to carry out the other stages of the process later. There is then first obtained the monohalogenhydrin ether of the diol with two primary hydroxyl groups in the maximum yield possible.

The following examples will further illustrate this invention but the invention is not restricted to these examples. The parts specified are parts by weight.

Example 1

620 parts of ethylene glycol are reacted at 60° C. with 694 parts of epichlorhydrin in the presence of boron trifluoride as catalyst. After distilling off 241 parts of unreacted glycol, a further 420 parts of epichlorhydrin are added and the mixture further heated at 60° C. The mixture of chlorhydrin ethers thus formed is then stirred with the calculated amount of 45% caustic soda solution in the presence of toluene as diluent at about −5° to 0° C. for about two hours. The toluene solution is then separated from the aqueous layer and, after distilling off the toluene, there are obtained 66 parts of glycol monoglycidyl ether of the boiling point 80° to 84° C. at 0.1 mm. Hg and 470 parts of glycol diglycidyl ether with the boiling point 110° C. at 0.1 mm. Hg. A further small amount of glycidyl ether may be recovered from the aqueous layer.

*Example 2*

900 parts of 1.4-butane-diol are reacted at 60° C. in the presence of boron trifluoride (which is dissolved in ether) with 693 parts of epichlorhydrin. After distilling off 356 parts of unreacted butane-diol, a further 420 parts of epichlorhydrin are added. The resultant chlorhydrin ether is converted as described in Example 1 into the diglycidyl ether. 230 parts of butane-diolmonoglycidyl ether and 1.150 parts of butane-dioldiglycidyl ether are obtained. The monoglycidyl ether may be returned to the reaction process.

*Example 3*

100 parts of the diglycidyl ether of ethylene glycol and epichlorhydrin having the epoxy value 1.1 (the epoxy value being the number of equivalent epoxy groups in 100 grams of diglycidyl ether) prepared according to Example 1 are mixed with 57 parts of N-cyclohexylpropylene diamine. This mixture hardens after about 24 hours at room temperature in a mold to a glass-clear hard and colorless cast article.

This application is a continuation-in-part of our application Serial No. 581,825, filed May 1, 1956, now abandoned.

We claim:

1. In a process for preparing diglycidyl ethers from an epihalogenhydrin selected from the group consisting of epichlorohydrin and epibromohydrin and a diol having two primary hydroxyl groups wherein said epihalogenhydrin and said diol are reacted in the presence of an acid catalyst to form a diol-dihalogenhydrin and wherein hydrogen halide is split off from said diol-dihalogenhydrin to form a diglycidyl ether, the improvement which comprises: reacting from 0.5 to 1.0 mol of said epihalogenhydrin with each mol of said diol having two primary hydroxyl groups in the presence of said acid catalyst to form a monohalogenhydrin ether; distilling off the unreacted diol; and thereafter reacting an additional 0.3 to 0.7 mol of epihalogenhydrin per mol of the original diol reactant with said monohalogenhydrin to form said dioldihalogenhydrin.

2. In a process for preparing diglycidyl ethers from an epihalogenhydrin selected from the group consisting of epichlorohydrin and epibromohydrin and a diol having two primary hydroxyl groups wherein said epihalogenhydrin and said diol are reacted in the presence of an acid catalyst to form a diol-dihalogenhydrin and wherein hydrogen halide is split off from said diol-dihalogenhydrin to form a diglycidyl ether, the improvement which comprises: reacting from 0.65 to 0.85 mol of said epihalogenhydrin with each mol of said diol having two primary hydroxyl groups in the presence of said acid catalyst to form a monohalogenhydrin ether; distilling off the unreacted diol; and thereafter reacting an additional 0.35 to 0.55 mol of epihalogenhydrin per mol of the original diol reactant with said monohalogenhydrin to form said diol-dihalogenhydrin.

3. In a process for preparing diglycidyl ethers from an epihalogenhydrin selected from the group consisting of epichlorohydrin and epibromohydrin and a diol having two primary hydroxyl groups wherein said epihalogenhydrin and said diol are reacted in the presence of an acid catalyst to form a diol-dihalogenhydrin and wherein hydrogen halide is split off from said diol-dihalogenhydrin to form a diglycidyl ether, the improvement which comprises: reacting 0.75 mol of said epihalogenhydrin with each mol of said diol having two primary hydroxyl groups in the presence of said acid catalyst to form a monohalogenhydrin ether; distilling off the unreacted diol; and thereafter reacting an additional 0.45 mol of epihalogenhydrin per mol of the original diol reactant with said monohalogenhydrin to form said diol-dihalogenhydrin.

4. In a process for preparing diglycidyl ethers from an epihalogenhydrin selected from the group consisting of epichlorohydrin and epibromohydrin and a diol having two primary hydroxyl groups wherein said epihalogenhydrin and said diol are reacted in the presence of an acid catalyst to form a diol dihalogenhydrin and wherein hydrogen halide is split off from said diol-dihalogenhydrin to form a diglycidyl ether, the improvement which comprises: reacting from 0.5 to 1.0 mol of said epihalogenhydrin with each mol of said diol having two primary hydroxyl groups at a temperature of from about 40° to about 110° C. in the presence of said acid catalyst to form a monohalogenhydrin ether; distilling off the unreacted diol; and thereafter reacting an additional 0.3 to 0.7 mol of epihalogenhydrin per mol of the original diol reactant with said monohalogenhydrin to form said diol-dihalogenhydrin.

5. In a process for preparing diglycidyl ethers from an epihalogenhydrin selected from the group consisting of epichlorohydrin and epibromohydrin and a diol having two primary hydroxyl groups wherein said epihalogenhydrin and said diol are reacted in the presence of an acid catalyst to form a diol-dihalogenhydrin and wherein hydrogen halide is split off from said diol-dihalogenhydrin to form a diglycidyl ether, the improvement which comprises: reacting from 0.65 to 0.85 mol of said epihalogenhydrin with each mol of said diol having two primary hydroxyl groups at a temperature of from about 40° to about 110° C. in the presence of said acid catalyst to form a monohalogenhydrin ether; distilling off the unreacted diol; and thereafter reacting an additional 0.35 to 0.55 mol of epihalogenhydrin per mol of the original diol reactant with said monohalogenhydrin to form said diol-dihalogenhydrin.

References Cited in the file of this patent

UNITED STATES PATENTS

| | | |
|---|---|---|
| 2,581,464 | Zech | Jan. 8, 1952 |
| 2,841,595 | Pezzaglia | July 1, 1958 |
| 2,898,349 | Zuppinger et al. | Aug. 4, 1959 |

OTHER REFERENCES

Cohen et al.: J. A.C.S., 75:1733 (1953).